United States Patent
Juzswik (10) Patent No.: US 8,498,759 B1
(45) Date of Patent: Jul. 30, 2013

(54) METHOD AND APPARATUS FOR DETERMINING A CONDITION AND RELATIVE LOCATION OF AN INNER TIRE AND AN OUTER TIRE OF A TIRE PAIR

(75) Inventor: David L. Juzswik, Commerce Township, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 13/400,393

(22) Filed: Feb. 20, 2012

(51) Int. Cl.
*G05D 1/00* (2006.01)

(52) U.S. Cl.
USPC .......................................................... 701/10

(58) Field of Classification Search
None
See application file for complete search history.

(56) References Cited

U.S. PATENT DOCUMENTS

| | | | |
|---|---|---|---|
| 4,567,460 | A | 1/1986 | Gebler |
| 5,526,263 | A | 6/1996 | Tanaka et al. |
| 5,739,431 | A | 4/1998 | Petri |
| 5,808,190 | A | 9/1998 | Ernst |
| 6,112,587 | A | 9/2000 | Oldenettel |
| 6,259,361 | B1 | 7/2001 | Robillard et al. |
| 6,922,140 | B2 | 7/2005 | Hernando et al. |
| 7,237,433 | B2 | 7/2007 | Walenty et al. |
| 7,367,227 | B2 * | 5/2008 | Stewart et al. ................ 73/146 |
| 7,373,811 | B1 | 5/2008 | Cook |
| 7,392,119 | B2 | 6/2008 | Allard et al. |
| 7,549,327 | B2 * | 6/2009 | Breed ............................. 73/146 |
| 7,646,195 | B2 | 1/2010 | Salfelner |
| 7,760,080 | B2 * | 7/2010 | Breed et al. ................... 340/447 |
| 2002/0047715 | A1 | 4/2002 | Holm |
| 2005/0156722 | A1 * | 7/2005 | McCall et al. ................ 340/447 |
| 2005/0179530 | A1 * | 8/2005 | Stewart et al. ................ 340/447 |
| 2005/0192727 | A1 * | 9/2005 | Shostak et al. ................... 701/37 |
| 2006/0025897 | A1 * | 2/2006 | Shostak et al. ..................... 701/1 |
| 2006/0044125 | A1 | 3/2006 | Pierbon |
| 2006/0142911 | A1 | 6/2006 | Allard et al. |
| 2008/0030314 | A1 | 2/2008 | Watabe |
| 2008/0246467 | A1 | 10/2008 | Vial et al. |
| 2009/0204361 | A1 | 8/2009 | Watasue |
| 2010/0231430 | A1 | 9/2010 | Nakajima |

FOREIGN PATENT DOCUMENTS

| EP | 0 806 306 A2 | 11/1997 |
|---|---|---|
| JP | 2010-122023 A | 3/2010 |

OTHER PUBLICATIONS

U.S. Juzswik et al. U.S. Appl. No. 12/876,756, filed Sep. 7, 2010, entitled "Method and Apparatus for Determining Tire Position a Vehicle".
U.S. Hannon U.S. Appl. No. 12/940,574, filed Nov. 5, 2010 entitled "Method and Apparatus for Determining Tire Condition and Location".

* cited by examiner

*Primary Examiner* — Thomas Tarcza
*Assistant Examiner* — Adam Alharbi
(74) *Attorney, Agent, or Firm* — Tarolli, Sundheim, Covell & Tummino LLP (57) ABSTRACT

An apparatus determines a condition and relative location of an inner tire and an outer tire of a tire pair. Each tire has an associated tire-based sensor assembly that senses a tire condition, senses acceleration, and transmits, in response to its associated acceleration signal, having a unique tire identification and associated sensed tire condition. A tire rotation sensor senses rotation of the tire pair during vehicle movement and provides a tire rotation signal indicative thereof. A vehicle-based controller associates each of the unique identification signals with one of the inner tire location and the outer tire location responsive to a phase relationship between the received transmitted signals from the tire-based sensor assemblies and the tire rotation signal.

6 Claims, 8 Drawing Sheets

METHOD AND APPARATUS FOR DETERMINING A CONDITION AND RELATIVE LOCATION OF AN INNER TIRE AND AN OUTER TIRE OF A TIRE PAIR

TECHNICAL FIELD

The present invention relates to a method and apparatus for determining a condition and relative location of an inner tire and an outer tire of a tire pair mounted on a vehicle.

BACKGROUND

Systems for sensing tire conditions and displaying sensed tire condition information to a vehicle occupant are known. Often, such systems are known as tire pressure monitoring ("TPM") systems even though the system may sense tire conditions in addition to pressure, such as tire temperature. Such TPM systems may include a tire-based sensor assembly that senses, for example, the air pressure and temperature inside its associated tire and transmits the sensed tire condition information to a vehicle-based receiver, i.e., a receiver mounted in the vehicle. The transmitted sensed tire condition signal may be a coded radio frequency ("RF") signal. The vehicle-based receiver is connected to a display located in the vehicle cabin that can display, for example, a warning signal to the vehicle operator when an under-inflated tire pressure condition exists or an over-heated tire condition occurs.

Each tire-based sensor assembly may have a unique identification ("ID") code associate therewith. The tire-based sensor assembly may transmit a signal that includes its associated unique ID code along with the sensed tire condition. The vehicle-based receiver can associate the received tire signal and unique ID with a particular tire location on the vehicle such as front right ("FR"), front left ("FL"), rear right ("RR"), or rear left ("RL"). By associating the tire ID with the tire location on the vehicle, the vehicle-based receiver is able to display the sensed tire condition information at each particular tire location so the vehicle operator can identify which tire (i.e., tire location) has a sensed, improper condition.

Associating a tire location with a tire-based transmitted ID code for each of the tire locations may require a "learning" process by the vehicle-based receiver. Methods have been proposed to accomplish this learning function including using signal interrogation in which each tire-based sensor assembly includes a receiver that is separately interrogated from a transmitter located outside of the tire using, for example, a low frequency ("LF") interrogation signal. In response to receiving an interrogation signal, the tire-based sensor assembly transmits a response signal having its associated unique ID. Upon receipt of the response signal from the tire-based unit, the vehicle-based receiver associates that unique tire ID with that tire location since the system "knows" which tire location was just interrogated. The vehicle-based system stores tire-based sensor IDs and tire location associations in memory for later use in its display operation.

Certain vehicles have multiple tires per side per axle. One such vehicle is a pickup truck referred to as a "dually." A dually pickup truck has four wheels/tires on the rear axle with two tires on each side, i.e., multiple tires per axle per side. Other vehicles, such as semi-trailers, may also have two tires per side on certain axles. Two tires on one side of a vehicle on the same axle are referred to herein as a tire pair.

SUMMARY OF THE INVENTION

The present invention is directed to a method and apparatus for determining a condition and relative location of an inner tire and an outer tire of a tire pair mounted on a vehicle. In this way, not only can a vehicle corner or axle location be identified for or associated with the tire pair, but a particular tire-based transmitter (unique tire ID) of a tire pressure monitor assembly can be associated with either the inside tire or the outside tire of the tire pair, i.e., the inner and outer tire relative location can be determined.

In accordance with an example embodiment of the present invention, an apparatus is provided for determining a condition and relative location of an inner tire and an outer tire of a tire pair mounted on one side of a vehicle. The apparatus comprises tire-based sensor assemblies, the inner tire and the outer tire each having an associated tire-based sensor assembly. Each tire-based sensor assembly includes (i) an associated tire condition sensor for sensing a tire condition and providing a tire condition signal indicative thereof and (ii) an associated acceleration sensor for sensing acceleration and providing an acceleration signal as its associated tire rotates. The acceleration sensor of the inner tire and the acceleration sensor of the outer tire of the tire pair each have an axis of sensitivity in a predetermined orientation relative to each other. Each tire-based sensor assembly further includes a tire-based transmitter coupled to its associated tire condition sensor and acceleration sensor for transmitting, in response to its associated acceleration signal, a unique tire identification signal and its associated sensed tire condition signal. The apparatus further includes a tire rotation sensor mounted externally of the tire pair for sensing rotation of said tire pair during vehicle movement and providing a tire rotation signal indicative thereof. A vehicle-based controller receives the transmitted signals from each tire-based transmitter of the tire pair and the tire rotation signal. The vehicle-based controller includes means for associating each of the unique identification signals with one of the inner tire location and the outer tire location responsive to a phase relationship between the received transmitted signals from the tire-based sensor assemblies and the tire rotation signal.

In accordance with another example embodiment of the present invention, a method is provided for determining a condition and relative location of an inner tire and an outer tire of a tire pair mounted on one side of a vehicle. The method comprises the steps of sensing a tire condition of the inner tire and providing an inner tire condition signal indicative thereof, sensing acceleration of the inner tire and providing an inner tire acceleration signal as the inner tire rotates, and transmitting from said inner tire a unique tire identification and associated inner tire condition indication in response to the inner tire acceleration signal. The method further includes the steps of sensing a tire condition of the outer tire and providing an outer tire condition signal indicative thereof, sensing acceleration of the outer tire and providing an outer tire acceleration signal as the outer tire rotates, transmitting from said outer tire a unique tire identification and associated tire condition indication in response to the outer tire acceleration signal, and sensing externally of the tire pair rotation of said tire pair during vehicle movement and providing a tire rotation signal indicative thereof. The transmitted signals from the inner tire and the outer tire are received, and the tire rotation signal is received. The method further includes the step of associating each of the received unique identification signals with one of the inner tire location and the outer tire location responsive to a phase relationship between the transmissions from the inner tire and the outer tire relative to the tire rotation signal.

BRIEF DESCRIPTION OF THE DRAWINGS

The foregoing and other features and advantages of the present invention will become apparent to one skilled in the art upon consideration of the following detailed description of the invention along with the accompanying drawings, in which.

DETAILED DESCRIPTION

To more easily appreciate the present invention, a discussion is first presented showing an arrangement for determining a tire condition and relative location of the tire having a tire pressure monitor with unique identification on a vehicle with a single tire per side per axle arrangement. This system, shown in FIGS. 1-6, associates the front/rear/right/left location of each of the vehicle tires (i.e., associates the unique identification of each tire pressure monitor with tire location) and the condition for each tire.

Figure 1:
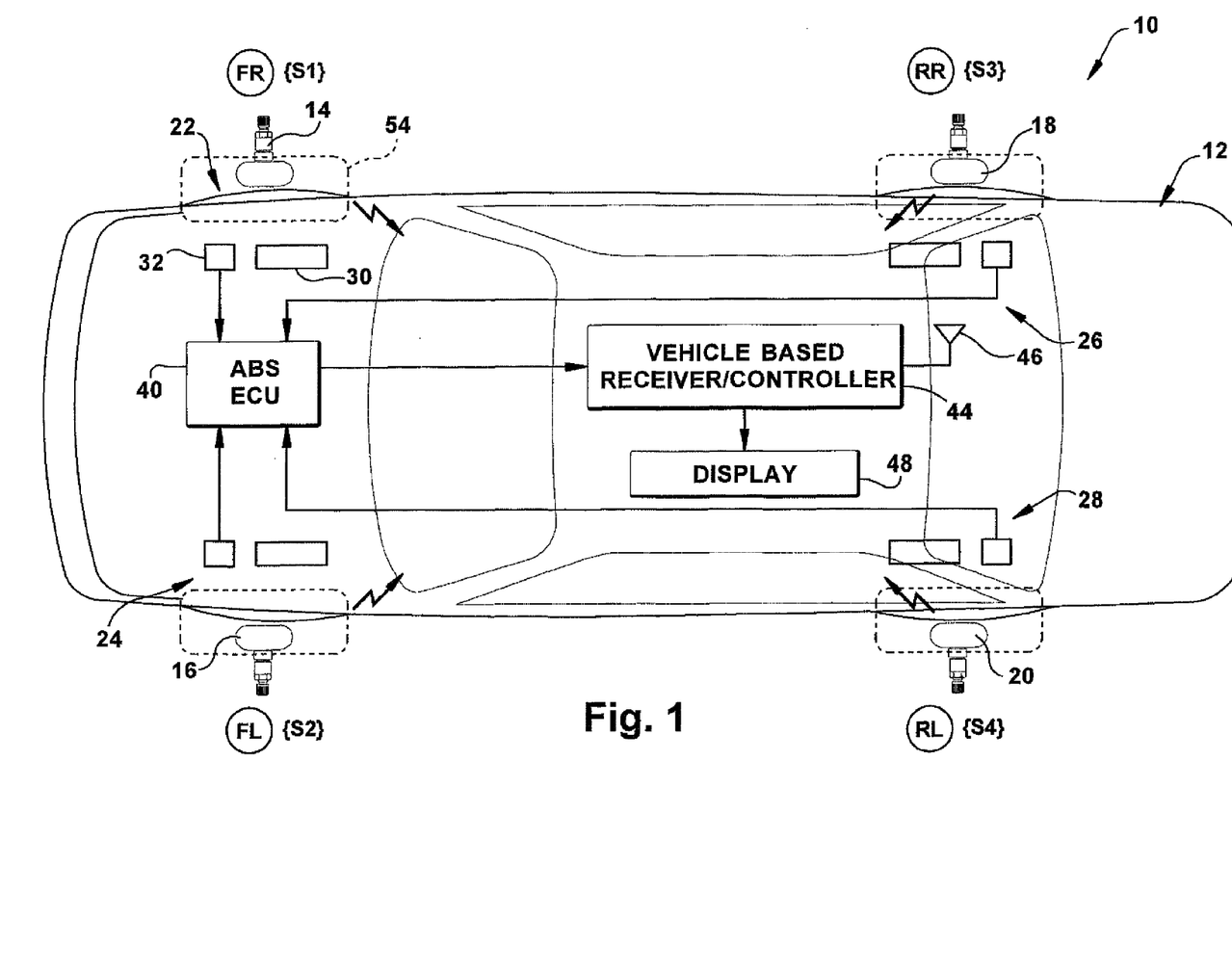
FIG. 1 is a schematic illustration of a vehicle having a tire pressure monitoring system.

Referring to FIG. 1, a tire pressure monitoring ("TPM") system 10 is shown mounted on a vehicle 12. The TPM system 10 includes a plurality of sensors 14 ("S1"), 16 ("S2"), 18 ("S3"), and 20 ("S4") located at each of the four corners front right ("FR"), front left ("FL"), rear right ("RR"), and rear left ("RL"), respectively, of the vehicle 12. As mentioned, the vehicle 12 (in FIG. 1) includes one wheel and tire per side per axle.

It should be understood that the tire-based sensor units 14, 16, 18, and 20 are each mounted in their associated tires in any one of several possible known arrangements. For example, each of the TPM sensors can be mounted as part of a valve stem assembly, mounted in a separate housing and attached to its associated wheel rim, or mounted to a side wall of the inside of the tire itself. Each of the tire-based sensor units 14, 16, 18, and 20 include a sensor for sensing acceleration that occurs during tire rotation and a sensor for sensing at least one condition of the tire, such as pressure and/or temperature. Each of the tire-based sensor units 14, 16, 18, and 20 include an associated transmitter, such as a radio frequency ("RF") transmitter, for transmitting the associated sensed tire condition information along with a unique identification ("ID") signal associated with that sensor.

The TPM system 10 further includes wheel rotation sensor assemblies 22, 24, 26, and 28 located at the FR, FL, RR, and RL corners of the vehicle, respectively, and mounted external of its associated tire. Each external wheel rotation sensor assembly is similar and, therefore, only one (wheel rotation sensor assembly 22) is described in detail.

The wheel rotation sensor assembly 22 includes a circular toothed plate or disc 30 that is mounted so as to rotate with its associated tire 54. A sensor 32 senses passing of each tooth of the disc 30 as the tire rotates and provides an electrical signal indicative thereof (e.g., a pulse is produced each time a tooth of the disc 30 passes the sensor 32). The wheel rotation sensor assemblies 22, 24, 26, 28 may be part of the vehicle's anti-lock braking system ("ABS") and may also be referred to as wheel speed ("WS") sensors. The sensor portion of each of the wheel rotation sensor assemblies is connected to an ABS electronic control unit ("ECU") 40.

The TPM system 10 further includes a vehicle-based receiver/controller 44. The vehicle-based receiver/controller 44 is connected to the ABS ECU 40 and receives wheel rotation signals indicative of the incremental rotational position of each of the wheels at the four corners of the vehicle via the sensor 32 and the toothed disc 30. The vehicle-based receiver/controller 44 also includes a receiving antenna 46 for receiving RF signals indicative of tire condition information transmitted from each of the tire-based sensor units 14, 16, 18, and 20. The vehicle-based receiver/controller 44 is connected to a display 48 located within the vehicle cabin for displaying tire condition information for each of the tires at each of the vehicle corners. The display 48 can take any of several known forms including a liquid crystal display ("LCD").

Figure 2:
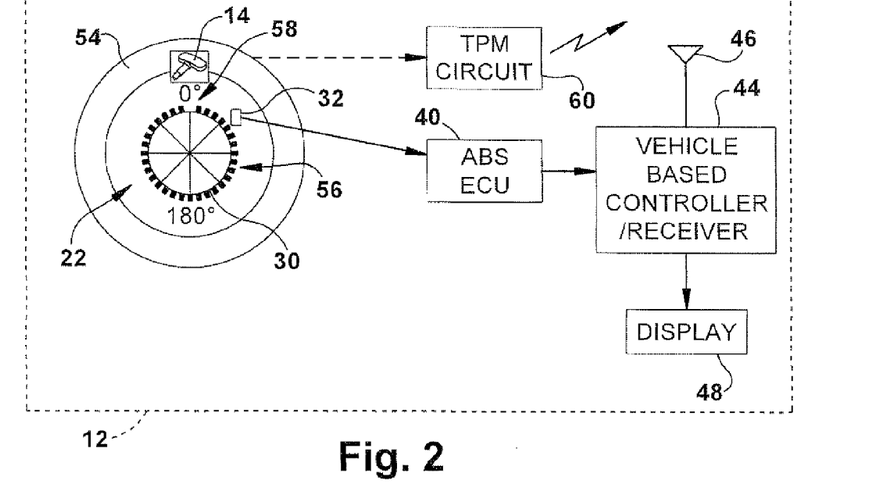
FIG. 2 is a schematic block diagram of the tire pressure monitoring system of FIG. 1 showing a sensor arrangement associated with one of the tires in greater detail.

Referring to FIG. 2, a tire 54 located at the FR corner of the vehicle includes the tire-based sensor unit 14 operatively mounted to the tire 54 for sensing tire acceleration along a predetermined axis of sensitivity as the tire rotates and tire condition. The wheel rotation sensor assembly 22 has its toothed disc 30 mounted so as to rotate with the tire 54. The sensor 32 provides an electrical signal (e.g., a pulse signal) when each tooth of disc 30 passing by the sensor 32. By way of example, the toothed disc has locations for seventy two teeth 56 to be equally spaced about the disc 30. However, the disc 30 includes seventy one teeth at these locations with one missing tooth at one of the locations. Each time a tooth passes the sensor 32, a pulse is provided. Any of several types of sensors could be used for sensor 32 such as an inductive sensor, a Hall Effect sensor, etc. If there are seventy two teeth locations, a pulse is output from the sensor 32 every five degrees except when the missing tooth location 58 passes the location of the sensor 32. The missing tooth location 58 is designated as the zero wheel position and can function as a reference point. In effect, if the missing tooth location being aligned with the sensor 32 is referred to as the zero position, then the ABS ECU controller can count the number of sensed pulsed and determine an angular position of the tire 54 relative to the zero position by knowing each received pulse represents a five degree rotation of the tire 54.

The output from the sensor 32 is connected to the ABS ECU 40. The ABS ECU 40 monitors the output of the sensor 32 and determines the angular position of the disc 30 relative to the zero position of the disc 30 (i.e., the missing tooth position being aligned with the sensor 32), and, in turn, determines the angular position of the tire 54 relative to the zero wheel disc position. It should be appreciated that, although no signal is generated as the missing tooth location pace 58 on the disc 30 passes the sensor 32, the ABS ECU 40 receives an otherwise continuous stream of pulses when the tire 54 is continuously rotating during normal vehicle movement. When there is a missing pulse, the ABS ECU "knows" that half way between the last pulse and the next received pulse is the "zero position." The ABS ECU then "knows" that each pulse received after the zero position is equal to five degrees of tire rotation. The angle monitoring/determination continuous as the disc 30 and tire 54 rotate with the zero position restarting the angle determination upon each complete tire revolution. The ABS ECU 40 is connected to the vehicle-based receiver/controller 44.

Figure 3:
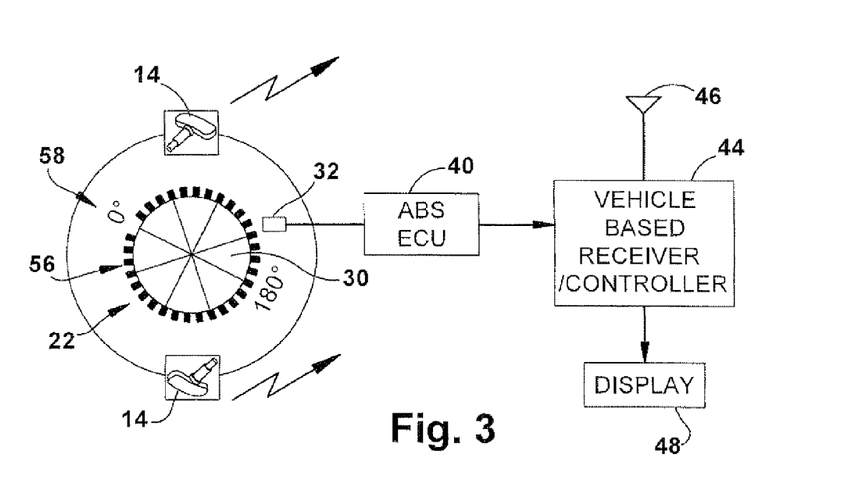
FIG. 3 is a schematic block diagram of the tire pressure monitoring system of FIG. 2 showing the tire-based sensor at two rotational positions where signal transmission could occur.

The tire-based sensor unit 14 includes a TPM processing circuit 60 (FIG. 4) that includes the tire condition sensor 82 and a tire rotation sensor 68. As shown in FIG. 3, the tire-based sensor unit 14 is arranged to transmit its tire condition RF signal at two separated rotational positions of the tire 54 as the tire rotates during normal vehicle movement, e.g., not parked but moving.

Figure 4:
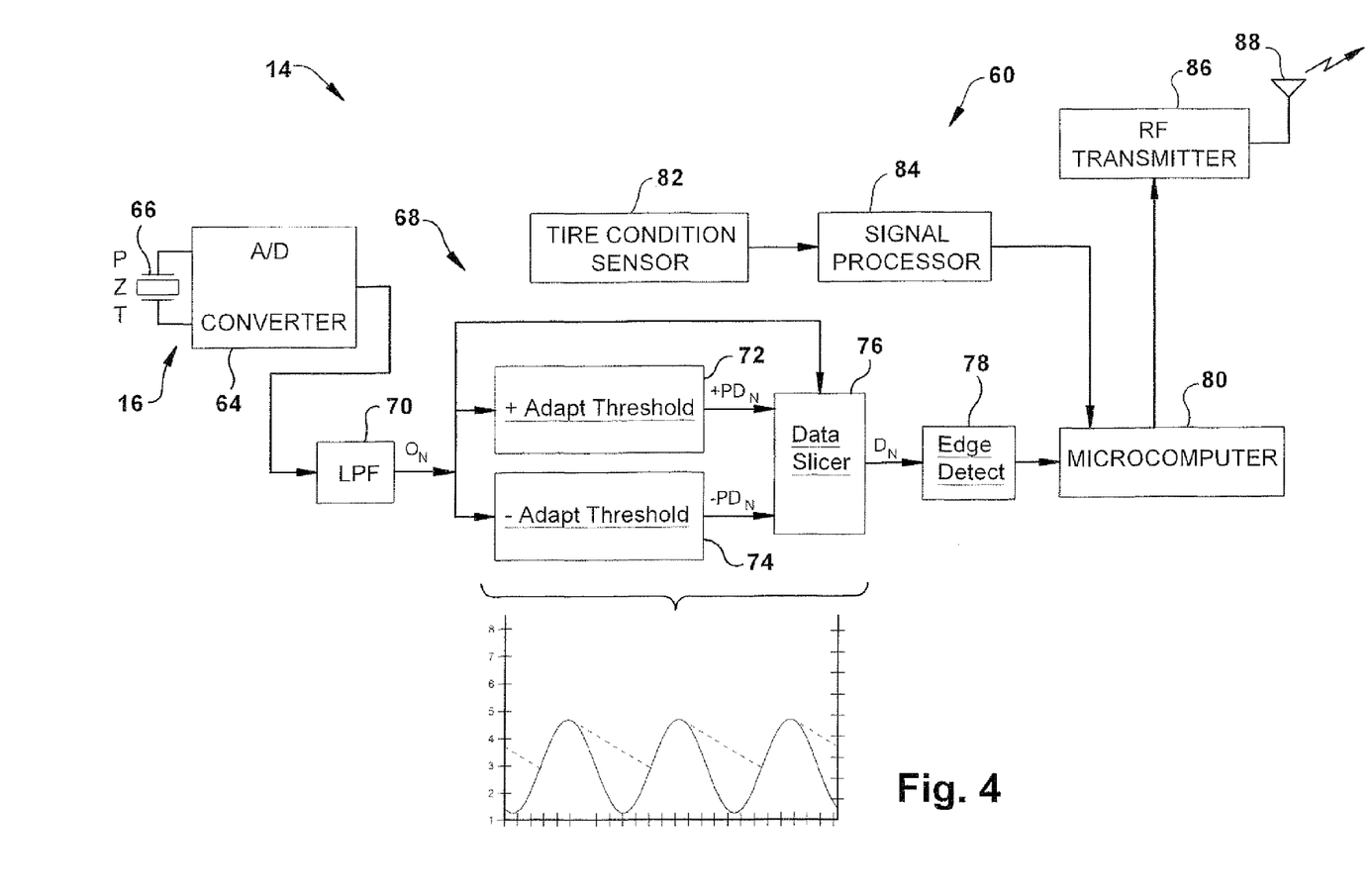
FIG. 4 is a schematic block diagram of the tire pressure monitoring system of FIG. 1 showing the tire-based sensor unit in further detail.

Referring to FIG. 4, the tire-based sensor unit 14 includes a TPM processing circuit 60. Those skilled in the art will appreciate that the control functions of the TPM processing circuit 60 could be accomplished using a controller, such as a micro-controller, by using discrete circuitry, a combination of different types of circuitry, or an application specific integrated circuit ("ASIC"), and can be embodied using either an analog or digital circuitry or a combination of both. Each of the tire-based sensor units 14, 16, 18, and 20 is constructed and operates in a similar manner and, therefore, for ease of discussion, only one tire-based sensor unit 14 is described in detail.

The tire-based sensor unit 14 includes an accelerometer 66 that take the form of a piezoelectric transducer ("PZT"). The accelerometer 66 provides or generates a voltage signal that changes in response to force/acceleration as the tire 54 rotates. As described in detail below, the axis of sensitivity of the accelerometer 66 is offset by 25 degrees relative to a tangent of the tire rim to which the tire 54 is mounted. Two forces that the accelerometer 66 experiences during tire rotation are centripetal force and earth's gravitational force. As the accelerometer 66 travels in a circle during one tire rotation, it will experience the earth's gravitation force change from +1 G to −1 G. If the wheel/tire is rotating at a constant rate, the output of the accelerometer will vary in a sinusoidal pattern over each revolution of the tire. The centripetal force experienced by the accelerometer 66 will either be of a consistent level, as would occur when the vehicle is traveling at a constant velocity, or will be slowly as vehicle speed changes as compared to the change resulting from the earth's gravitational force experienced during tire rotation. The signal from the accelerometer 66 is used to control transmission of the tire condition signal and the associated ID of the tire-based unit.

The output of the accelerometer 66 is connected to an Analog-to-Digital Converter ("ADC") 64 that converts the analog output signal from the accelerometer 66 to a digital signal for further processing and analysis. The output of the ADC 64, representing the sampled acceleration signal, is connected to a low pass filter ("LPF") 70 that can be embodied as hardware or, alternatively, the LPF function can be accomplished in software. The LPF 70 aids in removing road noise from the accelerometer output signal. The output of the LPF 70 is compared against a plus threshold value in comparator 72 and a minus threshold value in comparator 74 and also provides a signal reference level for use in a data slicer 76. The output of the data slicer 76 is connected to an edge detector circuit 78. The output of the edge detector is connected to a microcomputer 80. The LPF 70, threshold comparators 72, 74, data slicer 76, and edge detector circuit 78 are arranged so as to provide a first output signal when the sensed acceleration value is at one value and a second output signal when the sensed acceleration is at a second value. Furthermore, these components are selected and arranged so that, effectively, the output of the edge detector switches from the first signal to the second signal and from the second signal back to the first signal at 180 degree intervals of rotation of the tire. In other words, two signals are provided for each 360 rotation of the tire with the signals occurring at 180 degree intervals of rotation. As mentioned, the signal from the edge detector is used to trigger the transmission of the tire condition information and the associated tire-based unit's ID.

The tire-based sensor unit 14 further includes a tire condition sensor 82 for sensing tire pressure and/or tire temperature and/or any other desired tire condition. The output of the tire condition sensor 82 is connected to a signal processor circuit 84 that converts the signal from the tire condition sensor 82 into a digital format and places the information into a digital packet or word for ultimate transmission having information regarding the sensed tire condition. The output of the signal processor circuit 84 is connected to the microcomputer 80. As mentioned, the tire condition sensor 82 can be a pressure sensor for sensing tire pressure or can sense tire operating temperature or both or any other desired tire condition.

The microcomputer 80 has stored in its internal memory its associated, unique ID, e.g., sensor ID=S1 in this example for the FR tire location. As mentioned, each tire has its own associated unique tire ID different than the ID's of the other tire-based sensor units. The microcomputer 80 assembles the digital information packet or word for transmission including the sensed tire condition information and sensor unit's associated ID. The microcomputer 80 could include other data to be included as part of the information packet assembled for transmission if desired such as a wake-up portion, a checksum portion, etc. The microcomputer 80, however, does not include as part of the information in the data packet any angle information from the accelerometer 66 since the angle of the tire is not known. The output of the microcomputer 80 is connected to a radio frequency ("RF") transmitter circuit 86 for transmission via an antenna 88 of the information packet having the tire condition information and the ID of the tire-based sensor unit. The microcomputer 80 includes internal timers that control sample timing of the tire condition sensor 82 signal. Transmission is controlled in response to the acceleration signal, which, as mentioned, occurs twice per revolution of the tire, one transmission each 180 degree rotation of the tire.

Figure 5:
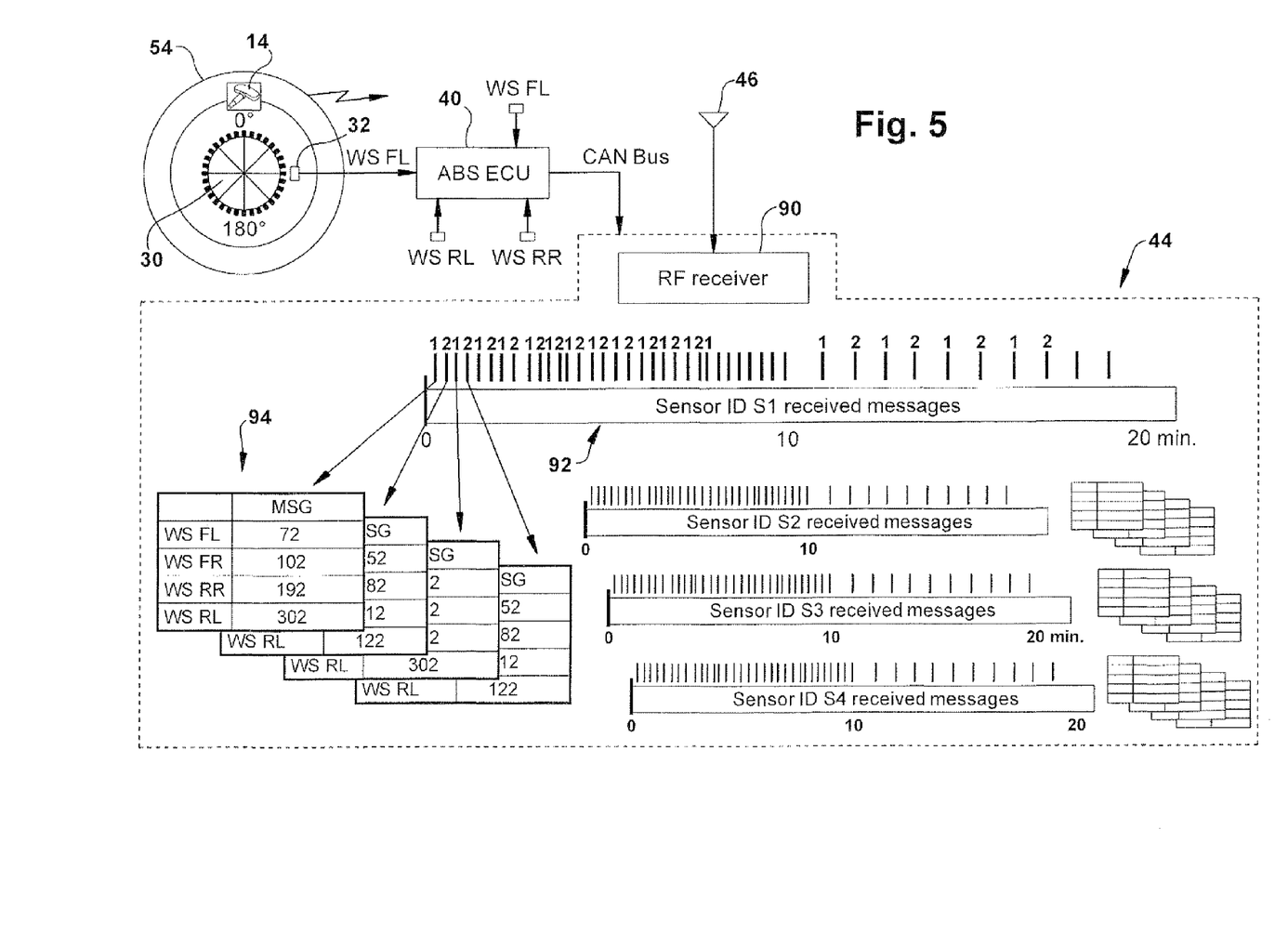
FIG. 5 is a functional block diagram of the tire pressure monitoring system of FIG. 1 showing the vehicle-based receiver in further detail.

Referring to FIG. 5, the operation of the vehicle-based receiver/controller 44 will be appreciated as well as the transmission control followed by the tire-based sensor unit 14. The vehicle-based receiver/controller 44 is connected to the output of the ABS ECU 40 via an appropriate connection such as the vehicle's controller-area network bus ("CAN-bus"). The vehicle-based receiver/controller 44 monitors the pulse output associated with each sensor/toothed disc unit of each of the vehicle's four corners. From the pulse count and "knowing" when the zero tooth location passes the associated sensor, the vehicle-based receiver/controller 44 can determine angular position of each of the wheels of the vehicle from each of the wheel rotation sensor assemblies (also referred to as wheel speed sensors) 22, 24, 26, and 28, also designated as WS FR, WS FL, WS RR, and WS RL, respectively. The vehicle-based receiver/controller 44 also includes an RF receiver 90 connected to a receiving antenna 46 for receiving and demodulating the tire ID and condition information from each of the transmitters associated with the tire-based sensor units 14, 16, 18, and 20.

The received signals from each of the tire-based sensor units 14, 16, 18, and 20 is referred to herein as message 1 when the wheel or tire rotation is at the first position and message 2 when the wheel or tire rotation is at the second position, which is approximately 180 degrees from the first position, as sensed by the accelerometer 66. Recall that the vehicle based receiver/controller does not "know" which position the tire is at when the transmission occurred but only "knows" that the transmissions occur at 180 degree intervals of rotation.

An event graph 92 represents the occurrence of received tire condition signals from one of the tire-based sensor unit 14 ID S1. When each tire condition signal is received, the vehicle-based receiver/controller 44 monitors the angular position of each of the four wheels as determined from each associated ABS wheel speed sensors 22, 24, 26, and 28. The tables 94 are the angle values in degrees for the four wheels as determined from the ABS wheel speed sensor signals each time an RF tire condition message is received. These angular values are stored in memory as the angle values that occurred when a message was received having a tire ID=S1. Similarly, the wheel rotational positions are stored for each of the tire-based units S2, S3 and S4 each time an RF signal from one of their associated tire condition sensors is received.

The transmission of the RF signals from each tire based unit, as mentioned, is controlled by the microcomputer 80. The microcomputer 80 "knows" when tire rotation is occurring from the signal output from the accelerometer 66. During a first ten minute period after initial tire rotation begins, it may be desirable to transmit a tire condition signal forty times. During forty predetermined time slots over the ten minute period, the microcomputer 80 monitors the tire condition sensor 82 and transmits a tire condition signal when the edge detector indicates the tire has reached the first rotational position or the second rotational position where the first and second rotational positions are 180 degrees apart. The microcomputer 80 can transmit the tire condition signal in any of several patterns in response to the detection of the first and second positions during tire rotation. For example, the microcomputer 80 can transmit at a first of the forty time slots when the tire position reaches position 1. During the second of the forty time slots, the microcomputer 80 could wait and transmit when the tire position reaches position 2, and so on. The result would be tables 94 having a tire transmission pattern of 1, 2, 1, 2, etc. Any other desired pattern could be used by the microcomputer 80. After a first 10 minute time interval of forty transmissions, the microcomputer could change the transmission timing to one time every minute. Also, the microcomputer 80 can either maintain the same transmission pattern or could change the transmission pattern.

The vehicle-based receiver/controller 44, after a sufficient amount of data is collected (sufficient numbers of tables 94 are filled), determines which tire angular positions correlate the best with having received tire ID's and condition signals that would have occurred commensurate with 180 degree rotational positions of the tire. Assume that the microcomputer 80 was controlling the transmitter circuit 86 to transmit in a 1, 2, 1, 2, pattern. Also assume that the table 94 indicates that the FR ABS wheel speed sensor (WS FR) always measured angles 102 and 282 degrees (180 degree interval), respectively, each time a tire condition signal had a S1 ID. Then, the vehicle-based receiver/controller 44 could assume that the tire ID S1 is located at the FR corner of the vehicle. Once tire condition data and ID date transmissions correlates with tire angular position as determined from the wheel speed sensors with a confidence level above a predetermined threshold, that tire ID for that vehicle tire location is stored in an internal memory of the vehicle-based receiver/controller 44 for later use in identifying the tire location when tire condition information is to be displayed on the display 48, e.g., an under inflated tire occurrence. The confidence level can be determined by several different methods. One example is to determine that the WS angle data in a table does not vary over a predetermined number of samples by more than a predetermined amount.

Once the sensor ID's are correlated with the vehicle corner locations, the pressure/temperature information portion of the transmitted signal is monitored for each of the sensors, and the tire condition information can be displayed along with the associated determined vehicle tire location information for the vehicle operator.

Figure 6:
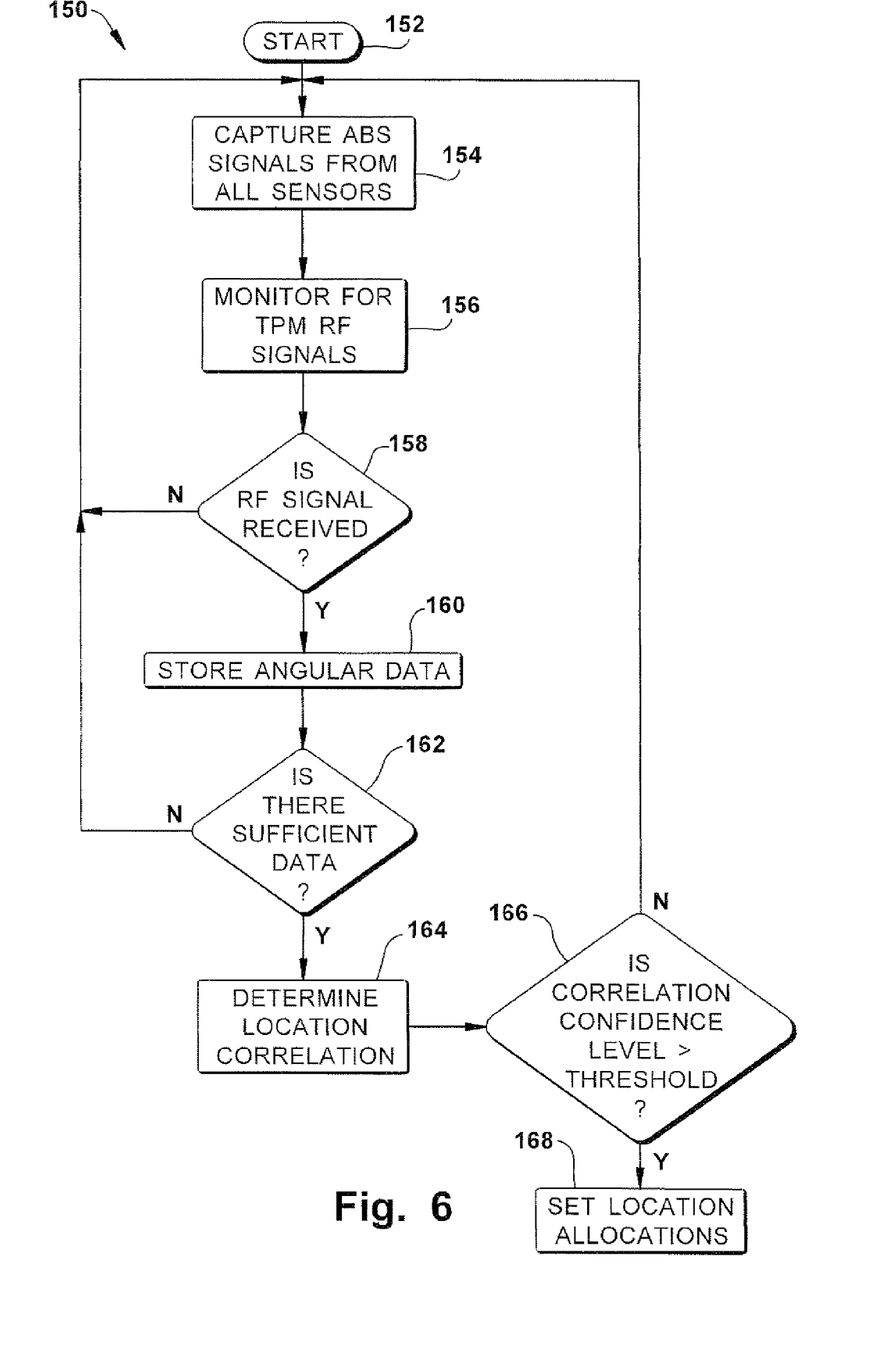
FIG. 6 is a flow chart depicting a control process to correlate each tire-based sensor location with tire location on the vehicle.

As those skilled in the art will appreciate, the display of tire condition information can be limited only to abnormal tire conditions or can be continuous tire pressure and temperature information, if so desired. Referring to FIG. 6, a flow chart is shown depicting a control process 150 for determining tire location in a TPM system. The control process 150 starts at step 152 where initial conditions, flags, appropriate values, etc., are set. At step 154, the ABS signals indicative of the wheel angular position from each of the vehicle tires is continuously captured and provided to the vehicle-based receiver/controller 44. In step 156, the vehicle-based receiver/controller 44 monitors for received RF tire condition information signals from the tire-based units. In step 158, a determination is made whether RF signals have been received. If negative, the process loops back to step 154 where wheel angular position from the ABS wheel speed sensors is continued to be captured. If the determination in step 158 is affirmative, the wheel angles from all four wheels are temporarily stored in step 160 (table 94). In step 162, a determination is made as to whether there has been a sufficient amount of data collected to make a location determination. For example, it may be desired to have 10-20 samplings of data before a location determinations is made. If there is not enough data, the process loops back to step 154 until a sufficient amount of data is received and stored.

In step 164, a determination of wheel location is performed by correlating the angular wheel position that best corresponds to the event of the received tire condition signals, e.g., wheel FR rotates 180 degrees each time a tire condition signal having S1 ID is received therefore correlating S1 with the FR location. In step 166, a determination is made as to whether the determined tire location correlation has a confidence value greater than a predetermined value. Assuming that the confidence level of the determination is sufficient, the tire-based unit ID and determined tire location information is stored in memory in step 168. If the confidence value is not greater than a predetermined level, no location information is stored, the process loops back to step 154, and any previous stored location information is retained. The vehicle-based receiver/controller 44 correlates the sensors S1, S2, S3, and S4 with tire locations FR, FL, RR, and RL on the vehicle.

Signal filtering is required even on smooth road surfaces. Both passive and adaptive digital filtering techniques can be used to smooth the signal over the frequency range of three to twenty Hertz without undue signal attenuation or use of battery energy.

Although the toothed disc, as described above, has a missing tooth to establish a zero position of the wheel, the wheel position at the time the vehicle is started can be designated the zero position, knowing that every 72 pulses (assuming a disc with 72 teeth) returns the wheel to the "zero" position (i.e., start position). Also, the tire-based sensor units could communicate via RF to the ABS ECU 40 and that the ABS ECU 40 could perform the correlation of tire-based units with vehicle corner location.

Referring now to FIGS. 7-10, one skilled in the art will appreciate the method and apparatus 200 of the present invention for determining a tire condition and relative location of a dually tire pair (corner location and inside/outside position) on a vehicle 202 with a tire pressure monitoring system. Recall that a dually tire pair on a vehicle includes a multi-tire per side per axle arrangement. Specifically, a vehicle, such as a pick-up truck, may have two wheels located on each side of the rear axle 204 of the vehicle 202. Such a vehicle is referred to as a "dually" since each of the rear corner locations 206, 208 of the vehicle have dual tires. Looking at the rear corner locations 206 and 208, the dual tire pairs have inside tires 212, 214 and outside tires 216, 218, respectively. The tires of the dual tire pair at the rear right corner location 208 of the vehicle 202 are designated herein as $RR_o$ for the rear right outside tire 218 and $RR_i$ for the rear right inside tire 214. The tires of the dual tire pair at the rear left corner location 206 of the vehicle 202 are designated herein as $RL_o$ for the rear left outside tire 216 and $LR_i$ for the rear left inside tire 212.

Figure 7:
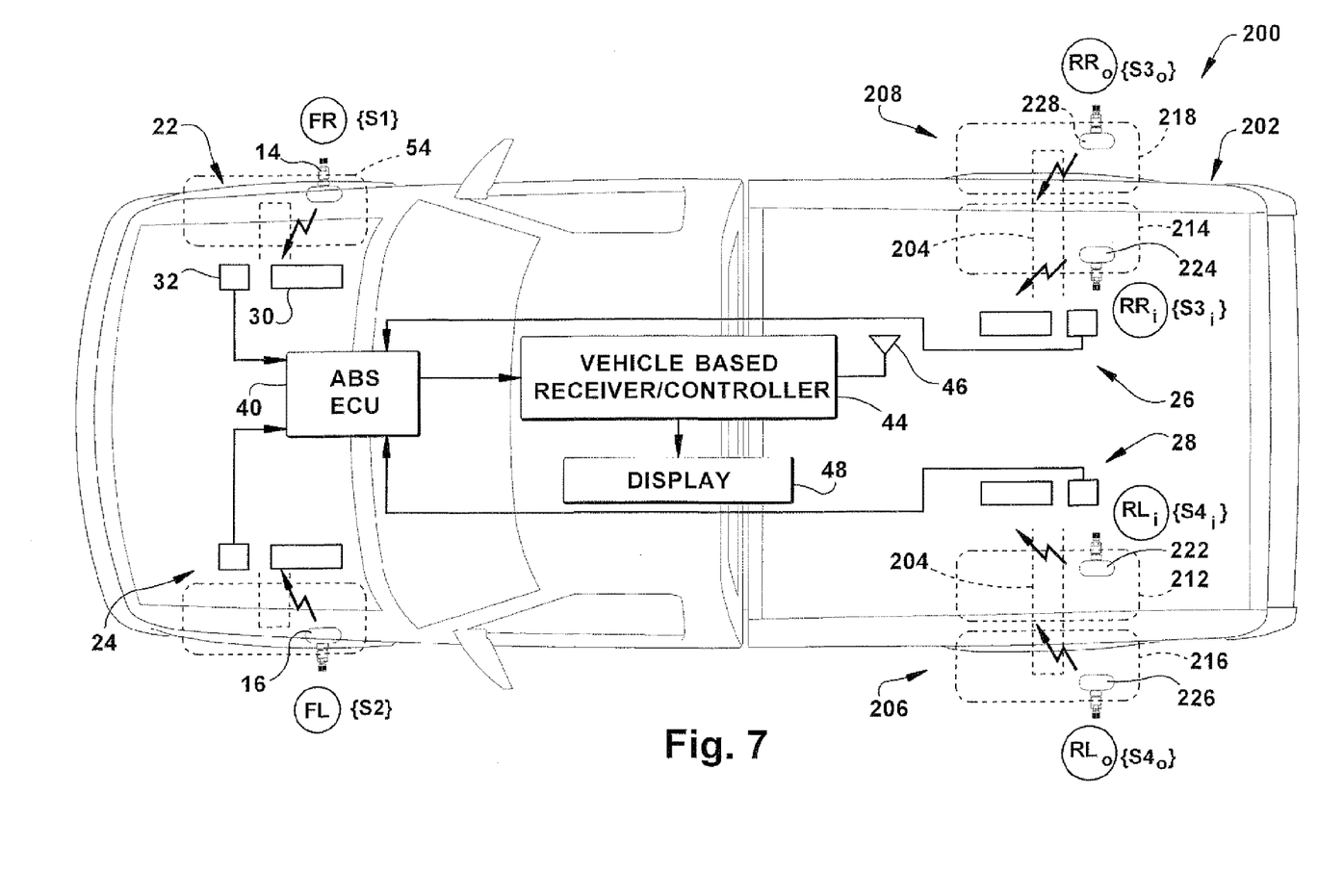
FIG. 7 is a schematic illustration of a vehicle with a dually tire arrangement having a tire pressure monitoring system in accordance with an example embodiment of the present invention.

In accordance with the present invention, each of the rear tires has an associated tire condition sensor 222, 224, 226, and 228, respectively. The $RR_o$ outside tire has an associated tire condition sensor unit 228 providing a unique sensor ID signal $\{S3_o\}$ and the $RR_i$ inside tire has an associated tire condition sensor unit 224 providing a unique sensor ID signal $\{S3_i\}$. The $RL_o$ outside tire has an associated tire condition sensor unit 226 providing a unique sensor ID signal $\{S4_o\}$ and the $RL_i$ inside tire has an associated tire condition sensor 222 providing a unique sensor ID signal $\{S4_i\}$.

Figure 8:
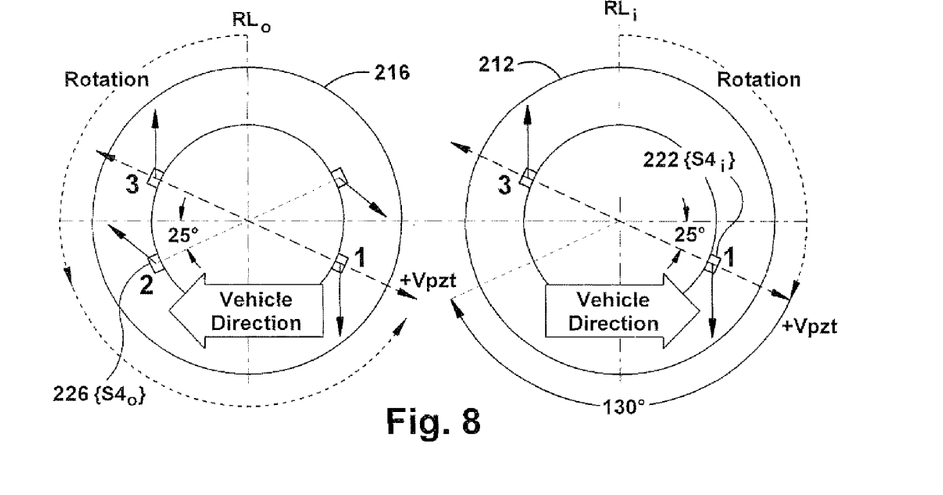
FIG. 8 is a schematic block diagram of the tire pressure monitoring system of FIG. 7 showing the sensor arrangement associated with the two tires on one axle on one side of the vehicle.
Figure 9:
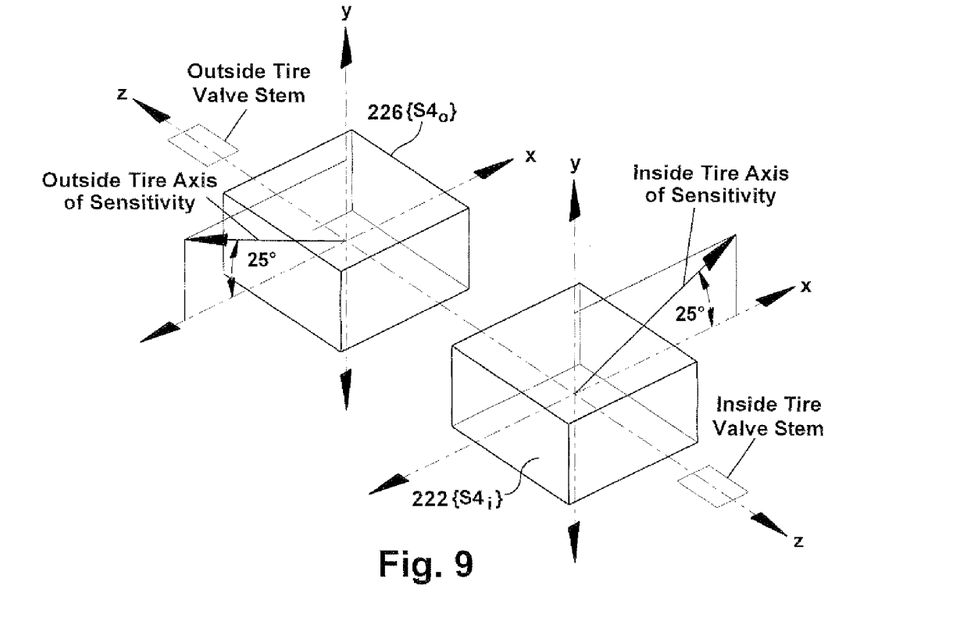
FIG. 9 is a tire condition sensor for the dually tire arrangement of the vehicle of FIG. 7 showing the axis or orientation of the two sensors in accordance with an example embodiment of the present invention.

The sensor units for each dually tire pair are mounted onto the rear axle in a known relative angular position relative to the sensor in the other associated tire of the dually pair. In accordance with one example embodiment of the present invention, tire condition sensor units 228 and 224 are aligned at substantially zero degrees relative to each other and tire condition sensor units 222 and 226 are aligned at substantially zero degrees relative to each other. Such an alignment of the sensors relative to each other is referred to as being "clocked" to each other. FIG. 8 shows the tire pair at the rear left corner location 206, where the $RL_o$ tire 216 is viewed looking at the TPM tire condition sensor unit 226 from the outside looking into the vehicle. The $RL_i$ tire 212 is viewed in the drawing looking at the TPM tire condition sensor unit 222 from inside the vehicle looking outward.

Figure 10:
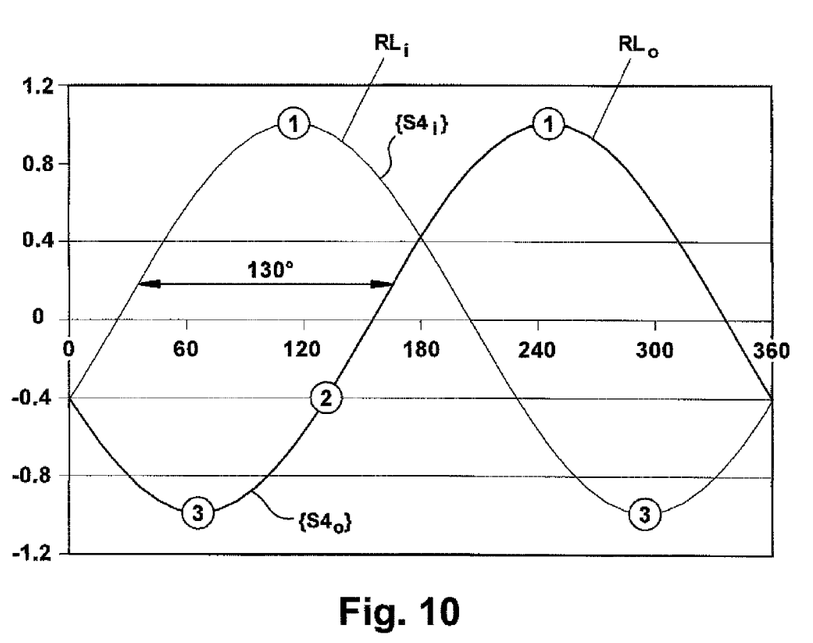
FIG. 10 is a graphical representation of the sensors' outputs during tire rotation for the dually tire arrangement shown in FIG. 7.

Each of the tire-based sensor units 222 and 226 has a 25 degree offset relative to a tangent of their rim mount and in opposite directions. As the tire pair at the corner location 206 rotates, the output signals of their associated accelerometers will be sinusoidal signals that are out of phase by 130 degrees (180 degrees—(the two 25 degree (i.e., 50 degree) offsets)). Thus, as the dually tire pair at corner location 206 rotates, the output signals from the associated accelerometer sensors of the tire condition sensor units 222 and 226 will be as depicted in the graph of FIG. 10. Although a zero degree relative alignment between the two sensors is described, other predetermined alignments between the two sensors could be used. The important thing is that the sensors from each dually pair that is part of the valve stem assembly are mechanically or manually synchronized (mechanically aligned or clocked) such as within a few degrees of each other (i.e., substantially aligned).

One of the inside tire or outside tire or both of the tires of the dually pair can be used for the corner location as described above. So, assume that only the inside tire 212 is used for corner location determination as described above. After the tire 212 is associated with the corner location at 206, the relationship between the signals of the tire condition sensor units 222 and 226 are used to determine the relative location between the two tires, namely the inside or outside location. This inside or outside location determination is accomplished by monitoring the lead/lag relationship of the transmitted signals which are offset by 130 degrees. For a given side of the vehicle, the inner or the outer tire-based sensor units will always be leading in phase angle (on one side of the vehicle, the inner tire signal leads the outer tire signal, and on the other side of the vehicle, the inner tire signal lags the outer tire signal). When the vehicle is moving in the forward direction, the outer tire signal leads the inner tire signal on the driver side (206) and the inner tire signal leads the outer tire signal on the passenger side (208).

Again, it should be appreciated that, for the dually pair, either one tire or both tires could be used for corner location by correlating condition and ID transmissions with 180 degree rotations monitored from the wheel speed sensors. The inside/outside determination is made from the lead/lag relationship of the transmitted signals.

The present invention has been described with regard to example embodiments. Those skilled in the art will perceive modifications and alterations. Such modifications and alterations are contemplated and are intended to be covered by the claims set forth below.

The invention claimed is:

1. An apparatus for determining a condition and relative location of an inner tire and an outer tire of a tire pair mounted on one side of a vehicle, the apparatus comprising:
    tire-based sensor assemblies, the inner tire and the outer tire each having an associated tire-based sensor assembly, each tire-based sensor assembly including (i) an associated tire condition sensor for sensing a tire condition and providing a tire condition signal indicative thereof and (ii) an associated acceleration sensor for sensing acceleration and providing an acceleration signal as its associated tire rotates, the associated acceleration sensor of the inner tire and the associated acceleration sensor of the outer tire of the tire pair each having an axis of sensitivity in a predetermined orientation relative to each other, each tire-based sensor assembly further including a tire-based transmitter coupled to its associated tire condition sensor and associated acceleration sensor for transmitting, in response to its associated acceleration signal, a unique tire identification signal and its associated sensed tire condition signal;
    tire rotation sensor mounted externally of the tire pair for sensing rotation of said tire pair during vehicle movement and providing a tire rotation signal indicative thereof; and
    a vehicle-based controller for receiving the transmitted signals from each tire-based transmitter of the tire pair and the tire rotation signal, said vehicle-based controller including means for associating each of the unique identification signals with one of the inner tire location and the outer tire location responsive to a phase relationship between the received transmitted signals from the tire-based sensor assemblies and the tire rotation signal.

2. The apparatus of claim 1 wherein said means for associating is responsive to a lead/lag relationship between said received transmitted signals relative to the tire rotation signal.

3. The apparatus of claim 1 wherein the associated acceleration sensor of the inner tire and the associated acceleration sensor of the outer tire are substantially circumferentially aligned.

4. The apparatus of claim 1 wherein the axis of sensitivity of the associated acceleration sensor of the inner tire and the axis of sensitivity of the associated acceleration sensor of the outer tire are offset from one another by a predetermined amount.

5. An apparatus for determining a condition and relative location of an inner tire and an outer tire of a tire pair mounted on one side of a vehicle, the apparatus comprising:

tire-based sensor assemblies, the inner tire and the outer tire each having an associated tire-based sensor assembly, each tire-based sensor assembly including (i) an associated tire condition sensor for sensing a tire condition and providing a tire condition signal indicative thereof and (ii) an associated acceleration sensor for sensing acceleration and providing an acceleration signal as its associated tire rotates, the associated acceleration sensor of the inner tire and the associated acceleration sensor of the outer tire of the tire pair each having an axis of sensitivity in a predetermined orientation relative to each other, each tire-based sensor assembly further including a tire-based transmitter coupled to its associated tire condition sensor and associated acceleration sensor for transmitting, in response to its associated acceleration signal, a unique tire identification signal and its associated sensed tire condition signal;

tire rotation sensor mounted externally of the tire pair for sensing rotation of said tire pair during vehicle movement and providing a tire rotation signal indicative thereof; and a vehicle-based controller for receiving the transmitted signals from each tire-based transmitter of the tire pair and the tire rotation signal, said vehicle-based controller including means for associating each of the unique identification signals with one of the inner tire location and the outer tire location responsive to a phase relationship between the received transmitted signals from the tire-based sensor assemblies and the tire rotation signal;

wherein the axis of sensitivity of the associated acceleration sensor of the inner tire and the axis of sensitivity of the associated acceleration sensor of the outer tire are offset from one another by a predetermined amount, and are positioned so that, as the tire pair rotates, the two acceleration signals are approximately 130 degrees out of phase relative to each other as referenced from the tire rotation signal.

6. A method for determining a condition and relative location of an inner tire and an outer tire of a tire pair mounted on one side of a vehicle, the method comprising the steps of:

sensing a tire condition of the inner tire and providing a tire condition signal indicative thereof;

sensing acceleration of the inner tire and providing an inner tire acceleration signal as the inner tire rotates;

transmitting from said inner tire a unique tire identification and associated tire condition indication in response to the inner tire acceleration signal;

sensing a tire condition of the outer tire and providing a tire condition signal indicative thereof;

sensing acceleration of the outer tire and providing an outer tire acceleration signal as the outer tire rotates;

transmitting from said outer tire a unique tire identification and associated tire condition indication in response to the outer tire acceleration signal;

sensing externally of the tire pair rotation of said tire pair during vehicle movement and providing a tire rotation signal indicative thereof;

receiving the transmitted signals from the inner tire, the outer tire, and the tire rotation signal; and associating each of the unique identification signals with one of the inner tire location and the outer tire location responsive to a phase relationship between the transmissions from the inner tire and the outer tire relative to the tire rotation signal.

\* \* \* \* \*